United States Patent
Cuennet et al.

(10) Patent No.: US 9,061,845 B2
(45) Date of Patent: Jun. 23, 2015

(54) MACHINE FOR PROCESSING ELEMENTS IN SHEET FORM, COMPRISING A CHAINSET TENSIONER

(75) Inventors: Ludovic Cuennet, Monthey (CH); Sandro Morelli, Renens (CH); Jean-Claude Rebeaud, Le Mont (CH)

(73) Assignee: BOBST MEX SA (CH)

( * ) Notice: Subject to any disclaimer, the term of this patent is extended or adjusted under 35 U.S.C. 154(b) by 0 days.

(21) Appl. No.: 13/825,354

(22) PCT Filed: Sep. 8, 2011

(86) PCT No.: PCT/EP2011/004534
§ 371 (c)(1),
(2), (4) Date: Mar. 21, 2013

(87) PCT Pub. No.: WO2012/038035
PCT Pub. Date: Mar. 29, 2012

(65) Prior Publication Data
US 2013/0187333 A1    Jul. 25, 2013

(30) Foreign Application Priority Data
Sep. 22, 2010  (EP) .................................. 10010183

(51) Int. Cl.
*B65H 29/04* (2006.01)
*B65G 23/44* (2006.01)
*B65H 5/02* (2006.01)

(52) U.S. Cl.
CPC .............. *B65H 5/028* (2013.01); *B65H 29/04* (2013.01); *B65G 23/44* (2013.01); *B65G 2201/022* (2013.01); *B65H 29/044* (2013.01); *B65H 2404/341* (2013.01); *B65H 2513/10* (2013.01); *B65H 2515/31* (2013.01);
(Continued)

(58) Field of Classification Search
CPC ....... B65G 23/44; B65H 29/003; B65H 29/04

USPC ............ 271/204–206; 198/803.3, 813, 470.1, 198/810.04
See application file for complete search history.

(56) References Cited

U.S. PATENT DOCUMENTS 3,847,030 A    11/1974  Grutter
4,284,192 A *   8/1981  Taylor ........................... 198/813
(Continued)

FOREIGN PATENT DOCUMENTS

EP    0 448 943 A2    10/1991
EP    0 680 906 A1    11/1995
(Continued)

OTHER PUBLICATIONS

International Search Report dated Dec. 16, 2011 issued in corresponding International application No. PCT/EP2011/004534.
(Continued)

*Primary Examiner* — Luis A Gonzalez
(74) *Attorney, Agent, or Firm* — Ostrolenk Faber LLP

(57) ABSTRACT

A machine for processing elements in sheet form, the machine having chainsets which move gripper bars for moving sheet elements through the machine. At least one tensioner device generates a tension force in the chainsets. The chainset tensioner device includes a drive member capable of generating a variable force, having an intensity dependent on the instantaneous production rate of the machine. Chainset wear is greatly reduced, and the life of the chainsets is lengthened considerably.

10 Claims, 4 Drawing Sheets

(52) U.S. Cl.
CPC .... *B65H 2555/132* (2013.01); *B65H 2601/524* (2013.01); *B65H 2801/42* (2013.01)

(56) References Cited

U.S. PATENT DOCUMENTS

| | | |
|---|---|---|
| 5,125,640 A | 6/1992 | Yerly et al. |
| 5,562,279 A | 10/1996 | Gillieron |
| 5,641,058 A * | 6/1997 | Merten et al. ............ 198/810.04 |
| 6,834,228 B2 * | 12/2004 | Serkh et al. .................. 701/115 |
| 6,845,979 B2 * | 1/2005 | Chiari et al. ................. 271/264 |

FOREIGN PATENT DOCUMENTS

| | | |
|---|---|---|
| EP | 1 679 188 A2 | 7/2006 |
| FR | 2 179 386 A5 | 11/1973 |
| JP | 2005-162466 | 6/2005 |
| JP | 2011063351 A * | 3/2011 |

OTHER PUBLICATIONS

Korean Office Action mailed Sep. 26, 2014 in corresponding Korean Application No. 2013-7008696, along with an English translation of relevant portions thereof.

* cited by examiner

MACHINE FOR PROCESSING ELEMENTS IN SHEET FORM, COMPRISING A CHAINSET TENSIONER

CROSS-REFERENCE TO RELATED APPLICATIONS

The present application is a 35 U.S.C. §§371 national phase conversion of PCT/EP2011/004534, filed Sep. 8, 2011, which claims priority of European Application No. 10010183.1, filed Sep. 22, 2010, the contents of which are incorporated by reference herein. The PCT International Application was published in the French language.

BACKGROUND OF THE INVENTION

The present invention relates to a machine for processing elements in sheet form, comprising a chainset tensioner.

The invention finds an advantageous, although nonexclusive, application in the field of machines for converting sheets of paper or cardboard for the manufacture of packaging.

A machine for processing elements in sheet form comprises a succession of workstations, possibly including a workstation which comprises a platen press for converting the sheets.

It is in fact common practice to carry out an operation of converting a sheet of paper or of cardboard in a machine for processing elements in sheet form. This may, for example, be a printing operation, including the printing of texts and/or patterns by hot-stamping, that is to say by using pressure to apply a colored or metalized film taken from one or more stamping strips. It may also involve embossing or scoring, which means to say deforming the sheet in order to impress a relief thereon. It may also involve cutting in order to cut the sheet to convert it into one or more copies. In industry, such a conversion operation is usually performed using a vertical platen press into which the sheets are introduced one at a time.

In the example of a machine schematically depicted in FIG. 1, the operation of converting each sheet is performed in a workstation 300 comprising a platen press, between a platen that is fixed horizontally, and a platen that is mounted with the ability to move in a vertical reciprocating movement. The other stations may, for example, perform work of ejecting waste after cutting, or work of separating the copies after cutting, or work of receiving the copies or converted sheets. Because this type of machine for processing elements in sheet form is automated, conveyor means are provided to bring each sheet in turn to each of the workstations.

In practice, this is usually a series of transverse bars fitted with grippers 70. These transverse bars, commonly known as gripper bars, each in turn grasp a sheet at its frontal edge, before pulling it in turn into the various workstations of the machine.

The ends of the gripper bars 70 are each respectively connected to a lateral chain forming a loop, commonly known as a chainset 80. Patents EP-B-448 943 and EP-B-680 906 describe in detail exemplary embodiments of gripper bars and chainsets.

Thanks to a movement transmitted to the chainsets 80, all of the gripper bars 70 will start out from a stationary position, will accelerate, will reach a maximum speed, will decelerate and then come to a standstill, thus describing an acceleration and speed cycle corresponding to the transfer of a sheet from one workstation to the next workstation. Each station performs its work in synchrony with this cycle that is commonly known as the machine cycle. The movements, accelerations, speeds, and forces are often represented on a curve corresponding to a machine cycle, with an abscissa value varying between 0° and 360°. An abscissa value on this kind of curve is commonly known as the press angle (AM). The machine schematically depicted in FIG. 1 comprises eight gripper bars 70. As a result, in this machine, a gripper bar will occupy a given position every eight machine cycles.

Vibration phenomena occur along the chainsets 80 and disrupt their dynamic behavior. In order to limit these vibration phenomena, springs are used to act as tensioners for the chainsets 80, applying a force to a guide device in contact with the chain, it being possible for example for the guide device to be a pulley.

With an increase in machine production rates, the gripper bars 70 and the chainsets 80 are subjected to increasingly high mechanical stresses and have therefore to be increasingly strong. The vibrational phenomena are also more violent, and dictate the use of increasingly powerful springs applying increasing tensions, and this further increases the mechanical stresses on the chainsets 80, thereby reducing their service life and increasing the risk of breakdown or breakage. It then becomes necessary to reinforce the chainsets 80, and therefore to increase the power of the driving and braking elements that will accelerate and decelerate them during each cycle.

SUMMARY OF THE INVENTION

The technical problem addressed by the subject matter of the invention is therefore that of improving the device for reducing the vibrational phenomena along a chainset. The present invention relates to a machine for processing elements in sheet form, comprising chainsets and at least one tensioner device generating a tension force in said chainsets. According to the invention, the chainset tensioner device comprises a drive member capable of generating a variable force, the intensity of which is dependent on the instantaneous production rate of the machine. Chainset wear is greatly reduced, and the life of said chainsets is lengthened considerably.

BRIEF DESCRIPTION OF THE DRAWINGS

This description, which is given by way of nonlimiting example, is intended to provide a better understanding of the substance of the invention and of how it may be embodied. It is given with reference to the attached drawings in which.

DESCRIPTION OF AN EMBODIMENT

It should be understood that throughout this text, the terms "sheet" or "element in sheet form" or even "sheet element" denote very generally any print support in the form of sheets, such as, for example, sheets of cardboard, paper, plastic, etc.

Figure 1:
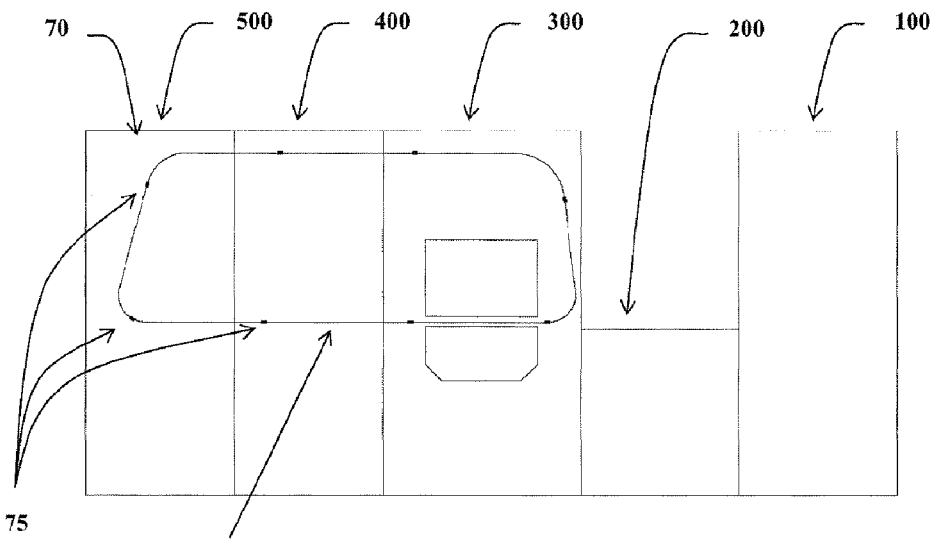
FIG. 1 in a very schematic way illustrates a machine for processing elements in sheet form.

FIG. 1 depicts a platen press for the conversion of sheets. This processing machine 1 is conventionally made up of several workstations which are juxtaposed with, but interdependent on, one another in order to form a unit assembly.

Thus there is a feed station 100, a feed board 200, a platen-type conversion device 300, a waste discharge station 400 and a receiving station 500.

Figure 2:
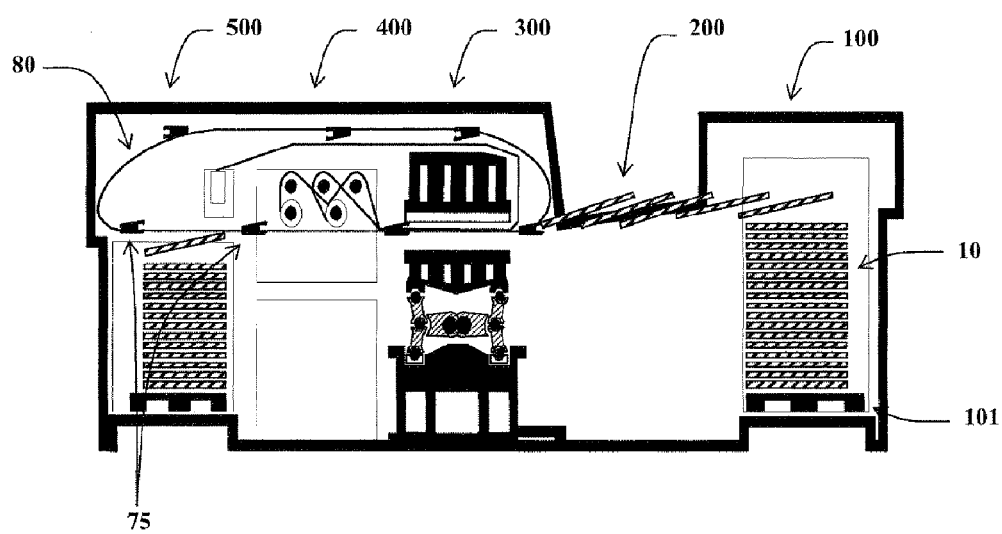
FIG. 2 shows a platen-type stamping machine.

FIG. 2 schematically depicts a conventional stamping machine. The feed station 100 is fed from a pallet 101, on which a plurality of sheets 10, for example sheets of cardboard, are stacked. These sheets are successively taken off the top of the stack by a gripper member capable of conveying them to the directly adjacent feed board 200. In certain machines, the sheets are removed from the bottom of the stack. It should be noted that such a feed station 100 and feed board 200 are entirely standard, and it is therefore simply for the sake of clarity that these have not been depicted in greater detail here.

At the feed board 200, the sheets (10) are laid out in a layer directly by the gripper member, which means to say that they are laid one after the other with partial overlap. The whole layer is then driven along toward the platen-type conversion device 300. For that, use is made of a conventional belt-type conveyor system which once again for obvious reasons of clarity has not been depicted. At the end of the layer, the lead sheet is systematically positioned accurately, for example using front and side lays.

In the machine schematically depicted in FIG. 2, the workstation 300 situated immediately after the feed board 200 comprises a platen-type conversion device. Finally, the stamping machine depicted in FIG. 2 comprises conveying means that allow each sheet to be moved along individually from the exit of the feed board 200 as far as the receiving station 500, via the workstations 300 and 400.

Just as in the machine depicted schematically in FIG. 1, the conveyor means use a series of gripper bars 70 which are mounted with transverse translational mobility via two chainsets 80 arranged laterally on each side of the stamping machine. Each chainset 80 travels in a loop which allows the gripper bars 70 to follow a trajectory that passes in succession through the platen press 300, the waste discharge station 400 and the receiving station 500.

The process of processing the sheets in the machine ends at the receiving station 500, the main function of which is to form the converted sheets 10 back into a stack. In the case of the stamping machine depicted in FIG. 2, these are sheets 10 which have undergone a stamping operation. In other machines, these may be copies obtained by cutting the sheet 10 in a platen-type cutting press. To do that, the conveyor means are arranged to release the sheets 10 or copies automatically when they come back into line with this new stack and therefore drop squarely onto the top of the stack.

In a processing machine according to the prior art, the two chainsets 80 experience tension generated by one or more tensioners. This or these tensioners may with equal preference be positioned in the machine along the path of the chainsets 80 and apply a force to the chain guide devices, for example pulleys. The force applied by the tensioner device to the chain guide device is determined preferably by the greatest vibrational phenomena that the chainsets 80 and the gripper bars 70 that they drive experience, that is by the maximum production rate of the machine. When wear of the chainsets 80 downgrades their dynamic behavior, the production rate of the machine has then to be reduced or the power of the tensioner increased. Most often, the tensioner device consists of a spring which works either in traction or in compression. However, the applied force may also be generated by any type of return device, such as a suspended mass for example. The tensioner device also is able to take up any play resulting from chainset wear and expansion.

Just as in the prior art, the tensioner device according to the invention can be situated at any location along the path of the chainsets 80.

According to the invention, the tensioner comprises at least one drive member 51 capable of generating a variable force, the intensity of which is dependent on the instantaneous production rate of the machine. That means that the tensioner is dynamic and adapts the force applied to a guide device constantly according to the production rate of the machine. This is because vibration along the chainsets 80 increases as a function of machine production rate and the tension has to be adjusted accordingly.

To do this, the tensioner device therefore comprises a drive member 51 which will typically be a motor. Although any type of motor can be used, use will advantageously be made of a linear motor. This is because there is a desire to control a force applied by the tensioner device. Now, a conventional motor will be controlled in terms of movement and will entail measurement of the tension in the chainset which will be regulated by closed-loop control, whereas for a linear motor control by current is equivalent to direct control of the force applied by the motor and therefore to direct control of the tension force in the chainsets. As a result, by using a linear motor controlled by current, there is no longer any need to measure the tension in the chainsets 80, which can be regulated using open-loop control.

The tension force in the chainsets 80 will therefore also be a function of the instantaneous production rate of the machine, and this will provide effective protection against vibrational phenomena while at the same time limiting the stresses on the chainsets 80. That makes it possible significantly to slow chain wear and significantly increase chain life.

Figure 3:
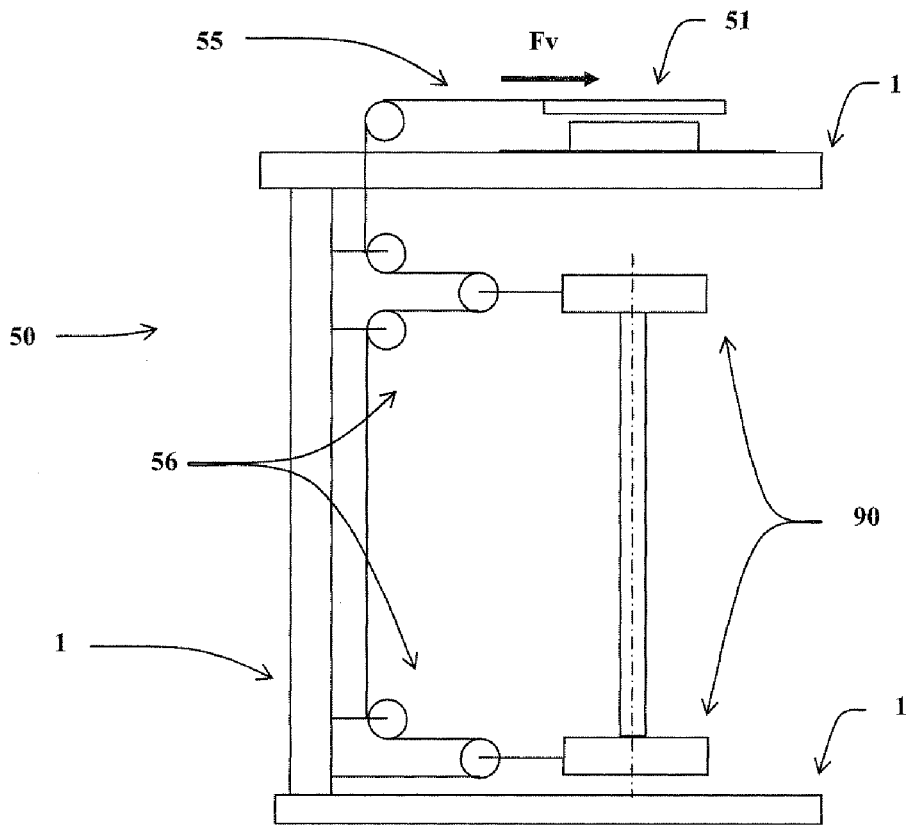
FIG. 3 is a schematic view from above of one particular embodiment of the invention.
Figure 4:
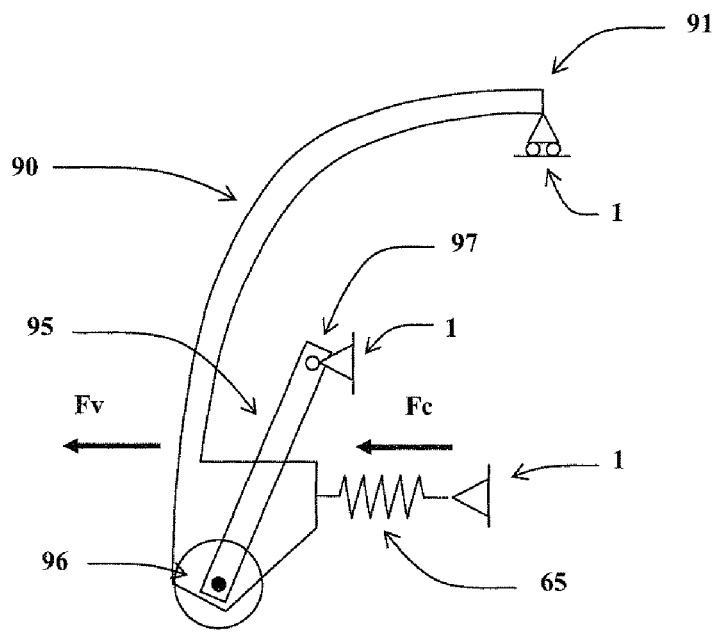
FIG. 4 is a schematic side view of one particular embodiment of the invention.

FIGS. 3 and 4 schematically depict one exemplary embodiment of the invention, in which the tensioner device is situated at the ejection station of the machine, that corresponds to the workstation 500 of FIGS. 1 and 2.

A dynamic tensioner according to the invention may comprise one drive member per chainset 80 or alternatively, as in the particularly advantageous embodiment depicted in FIG. 3, a single drive member 51 that generates a tension force in both chainsets 80 simultaneously by applying a force to two guide devices 90 simultaneously, these being one guide device per chainset 80.

Moreover, the dynamic tensioner may apply a tension force to the chainsets 80 by compression, that is to say by pushing against the chainsets, or alternatively by traction, that is to say by pulling on the chainsets. Advantageously, the tension force will be applied by traction. This is because, and as has been depicted in FIG. 3, only this type of application allows the use of belts 55, whereas compression dictates the use of more complicated and more expensive mechanical means.

Moreover, a belt 55 can easily collaborate with a block and tackle 56, that is to say with a device comprising pulleys for stepping down the traction force generated by the drive member 51.

In the example of a dynamic tensioner according to the invention that has been schematically depicted in FIG. 3, the traction force in the chainsets is generated by applying the force generated by a single linear motor 51 to two chain guide devices. This force is applied through a belt 55 collaborating with a block and tackle 56 that steps down by a factor of four the force generated by the linear motor 51. This allows the use of a less powerful and therefore less expensive linear motor.

FIG. 4 schematically depicts one particularly advantageous embodiment of the invention, in which the tensioner device generates the tension force in the chainsets 80 by acting on special chain guide devices, one of the ends of which is capable of translational movement with respect to the frame of the machine. This embodiment makes it possible to generate a significant tension force in the chainsets 80 while at the same time limiting the movements of the chain guide devices. If, for example, the force were applied to a pulley positioned in the middle of the upper part of the path of the chainsets, then to generate the same tension force in the chainsets 80 a far greater movement of the pulley would be needed than the movement that the guide device depicted in FIG. 4 effects.

The two ends of the chain guide devices 90 can be capable of translational movement, but it is particularly advantageous to have just one end 91 capable of translational movement and for the chain guide devices 90 to be connected to an end 96 of a pendular lever 95, the other end 97 of the pendular lever 95 being free to rotate about a pivot pin secured to the frame. This particular embodiment, which has been depicted in FIG. 4, allows the second end of the chain guide devices to effect a movement close to a translational movement, while at the same time greatly reducing friction by comparison with an embodiment in which both ends of the chain guide devices are capable only of translational movement.

As an option, the tensioner device 50 also comprises at least one return device 65 generating a substantially constant force Fc which is applied to the chain guide devices 90. This is because it is always desirable to generate a minimum tension force in the chainsets 80. This minimum force makes it possible for example to take up play resulting from wearing or expansion of the chainsets 80. As a result, the presence of a return device 65 generating a substantially constant force Fc allows the use of a less powerful drive member 51 and makes it possible to save on the energy consumed by this drive member. In addition, in the event of a breakdown of the drive member 51 or of its control circuit, the machine can still be used, but at a reduced production rate, thanks to this minimal tension force present in the chainsets.

In FIG. 4, the return device depicted is a spring working in compression. However, any type of return device can be used, for example a mass which applies a traction force through the action of its weight.

Figure 5A:
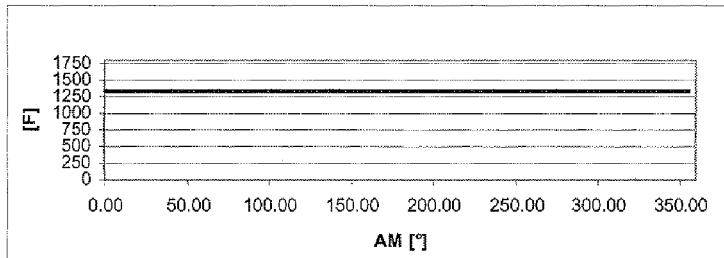
FIGS. 5a to 5e show graphs of Fv versus AM for various conditions.

The series of FIGS. 5b to 5e illustrates particularly advantageous embodiments. FIG. 5a depicts the variation in the force Fv (Fv is therefore the ordinate of the curve) during a machine cycle (the press angle AM is therefore the abscissa axis which varies from 0° to 360°) for the same instantaneous machine production rate, during which cycle the variable force Fv generated by the drive member 51 is dependent only on this instantaneous production rate. The curve is logically a straight line, and the value of Fv, which is constant over this machine cycle, is dependent only on the production rate of the machine during this cycle.

Now, it has been seen that, during a machine cycle, the chainsets 80 are stationary so that the elements 10 in sheet form can be converted in a workstation, and then accelerate to convey the elements 10 in sheet form, then slow down to a standstill when the elements 10 in sheet form are correctly positioned in the next workstation. As a result, the vibrational phenomena within the chainsets 80 vary greatly during a machine cycle. They are zero when the chainsets 80 are stationary, then increase sharply as the chainsets 80 accelerate, then decrease, etc. It is therefore particularly advantageous for the variable force Fv generated by the drive member 51 not only to vary as a function of the instantaneous production rate of the machine, but also to vary as a function of the press angle AM, which varies from 0° to 360° during a machine cycle.

Figure 5B:
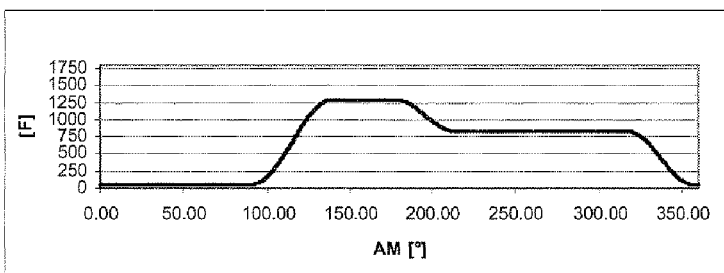

Thus, FIG. 5b represents the change in variable force Fv generated by the drive member 51 during a machine cycle, over the course of which the production rate of the machine is constant, assuming that the vibration phenomena in the chainsets are lower when the chainsets are decelerating than when they are accelerating or when they are at maximum speed. In this scenario, the variable force Fv generated by the drive member 51 is at a maximum only as the chainsets are accelerating or when they are at their maximum speed. The figure perfectly illustrates the energy savings and, above all, the very substantial reduction in stresses applied to the chainsets by the tension force within them. This type of control allows the life of the chainsets to be increased considerably while at the same time reducing chain wear.

Figure 5C:
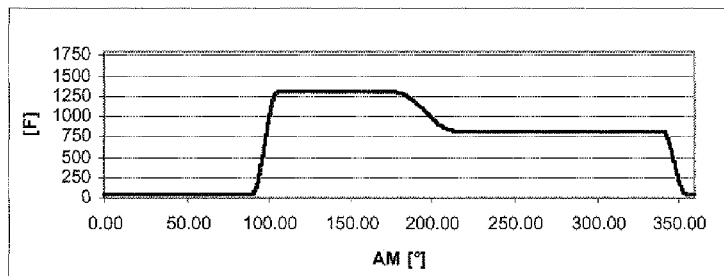

FIG. 5c illustrates the fact that the change in variable force Fv generated by the drive member 51 is also dependent on other parameters. The chainsets of the machine corresponding to FIG. 5c will accelerate and decelerate more quickly than the chainsets of the machine corresponding to FIG. 5b, this fact being manifested by steeper gradients in variations in the variable force Fv.

Figure 5D:
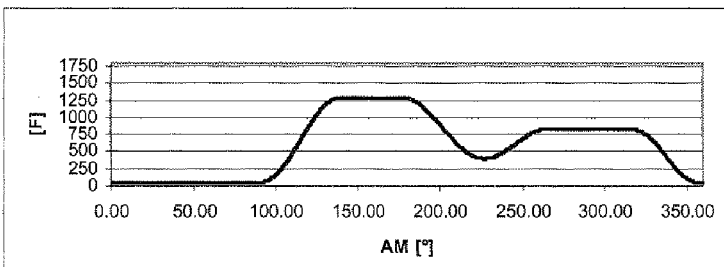
Figure 5E:
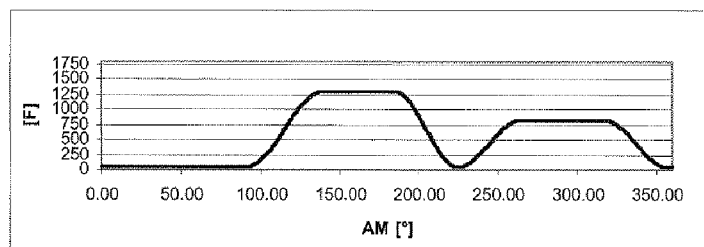

FIGS. 5d and 5e illustrate the fact that a fine analysis of the vibrational phenomena during a machine cycle may allow the variable force Fv to be made to vary in a more complex manner during the course of a machine cycle, in order to optimize the life of the chainsets 80.

In FIGS. 5b to 5e, the variable force Fv generated by the drive member 51 sometimes has a zero value. This is because these figures correspond to embodiments in which the tension device 50 also comprises a return device 65 which generates a substantially constant force Fc, as explained earlier. FIGS. 5d and 5e therefore correspond to machines equipped with extremely effective tensioner devices 50.

It should be noted that in the context of the invention, the idea of a processing machine covers a wide variety of embodiments because of the modular structure of these assemblies. Depending on the number, nature and layout of the workstations used, it is in fact possible to obtain a multitude of different processing machines.

It is also important to emphasize that there are other types of workstations than those already mentioned in the context of the description of the machine. Thoughts for example here turn to cutting stations, copy separation stations, waste ejection stations, stamping strip feed stations, etc. Finally, it must be understood that one and the same processing machine could very well be equipped with several stations of the same type.

The invention claimed is:

1. A machine for processing elements in sheet form, comprising:
   a plurality of workstations;
   a conveyor device for conveying each sheet in turn to various workstations, said conveyor device comprising a plurality of transverse gripper bars able to grasp each sheet by its frontal edge, each gripper bar having ends;
   two lateral chainsets connected to the ends of the gripper bars;
   at least one chain guide device per chainset; and
   at least one tensioner device for generating a tension force in the chainsets;
   wherein each of the at least one tensioner device comprises at least one drive member configured for generating a variable force of an intensity dependent on an instantaneous production rate of the machine, the variable force being applied to each of the at least one chain guide device per chainset, at least a portion of each of the at least one chain guide device being configured to move when the variable force is applied, each of the at least one chain guide device being a curved member extending between a first end of the curved member and a second end of the curved member.

2. The machine for processing elements in sheet form according to claim 1, wherein
the at least one drive member is a linear motor.

3. The machine for processing elements in sheet form according to claim 2, wherein the linear motor is controlled by electric current supplied to it.

4. The machine for processing elements in sheet form according to claim 1, wherein the portion of each of the at least one chain guide device comprises one of the ends of each of the at least one chain guide device, the one of the ends of each of the at least one chain guide device having translational mobility with respect to the frame of the machine.

5. The machine for processing elements in sheet form according to claim 1, wherein
the at least one drive member generates a variable traction force which is applied to each of the at least one chain guide device.

6. A machine for processing elements in sheet form, comprising:
a plurality of workstations;
a conveyor device for conveying each sheet in turn to various workstations, said conveyor device comprising a plurality of transverse gripper bars able to grasp each sheet by its frontal edge, each gripper bar having ends;
two lateral chainsets connected to the ends of the gripper bars;
at least one chain guide device per chainset; and
at least one tensioner device for generating a tension force in the chainsets;
wherein each of the at least one tensioner device comprises at least one drive member configured for generating a variable force of an intensity dependent on an instantaneous production rate of the machine, the variable force being applied to each of the at least one chain guide device per chainset, at least a portion of each of the at least one chain guide device being configured to move when the variable force is applied; and
wherein the tensioner device also comprises at least one return device configured for generating a constant force, and the return device is configured to apply the constant force in combination with the variable force generated by said drive member.

7. A machine for processing elements in sheet form, comprising:
a plurality of workstations;
a conveyor device for conveying each sheet in turn to various workstations, said conveyor device comprising a plurality of transverse gripper bars able to grasp each sheet by its frontal edge, each gripper bar having ends;
two lateral chainsets connected to the ends of the gripper bars;
at least one chain guide device per chainset; and
at least one tensioner device for generating a tension force in the chainsets;
wherein each of the at least one tensioner device comprises at least one drive member configured for generating a variable force of an intensity dependent on an instantaneous production rate of the machine, the variable force being applied to each of the at least one chain guide device per chain set, at least a portion of each of the at least one chain guide device being configured to move when the variable force is applied; and
wherein the at least one drive member is configured such that the variable force generated by the at least one drive member also varies as a function of the press angle.

8. A machine for processing elements in sheet form, comprising:
a plurality of workstations;
a conveyor device for conveying each sheet in turn to various workstations, said conveyor device comprising a plurality of transverse gripper bars able to grasp each sheet by its frontal edge, each gripper bar having ends;
two lateral chainsets connected to the ends of the gripper bars;
at least one chain guide device per chainset; and
at least one tensioner device for generating a tension force in the chainsets;
wherein each of the at least one tensioner device comprises at least one drive member configured for generating a variable force of an intensity dependent on an instantaneous production rate of the machine, the variable force being applied to each of the at least one chain guide device per chainset; and the at least one drive member generates a variable traction force which is applied to each of the at least one chain guide device; and
wherein the at least one drive member is a single drive member generating a variable traction force and each of the at least one tensioner devices further comprises a belt configured and located for applying the variable traction force, through the belt connected to two of the chain guide devices, simultaneously to the two of the chain guide devices.

9. The machine for processing elements in sheet form according to claim 8, further comprising a respective block and tackle connected to each of the at least one tensioner device that steps down the variable traction force generated by the single drive member.

10. A machine for processing elements in sheet form, comprising:
a plurality of workstations;
a conveyor device for conveying each sheet in turn to various workstations, said conveyor device comprising a plurality of transverse gripper bars able to grasp each sheet by its frontal edge, each gripper bar having ends;
two lateral chainsets connected to the ends of the gripper bars;
at least one chain guide device per chainset; and
at least one tensioner device for generating a tension force in the chainsets;
wherein each of the at least one tensioner device comprises at least one drive member configured for generating a variable force of an intensity dependent on an instantaneous production rate of the machine, the variable force being applied to each of the at least one chain guide device per chainset, at least a portion of each of the at least one chain guide device being configured to move when the variable force is applied;
wherein the portion of each of the at least one chain guide device comprises one of each of the ends of each of the at least one chain guide device, the one of the ends of each of the at least one chain guide device having translational mobility with respect to the frame of the machine; and
wherein each of the at least one chain guide device, to which the variable force generated by the at least one drive member is applied, is connected to one end of a pendular lateral lever, and the other end of the lever is free to rotate about a pivot pin secured to the frame of the machine.

* * * * *